Nov. 11, 1947.          J. R. ORELIND          2,430,731
                      AGRICULTURAL IMPLEMENT
                       Filed Oct. 16, 1944          2 Sheets-Sheet 1
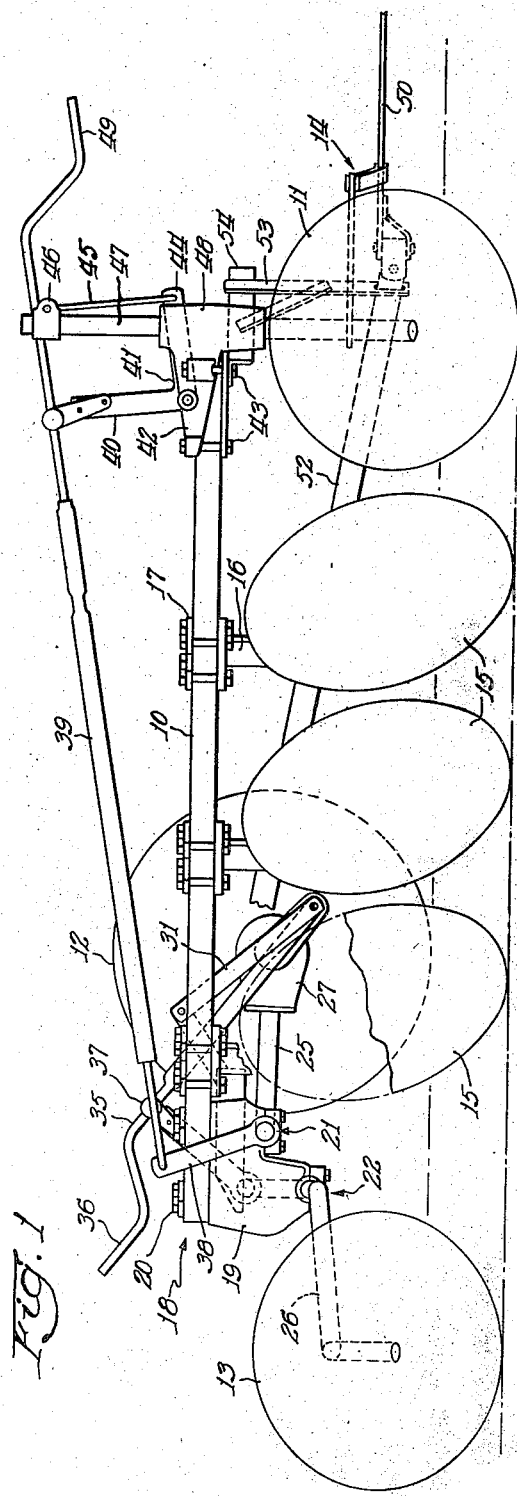
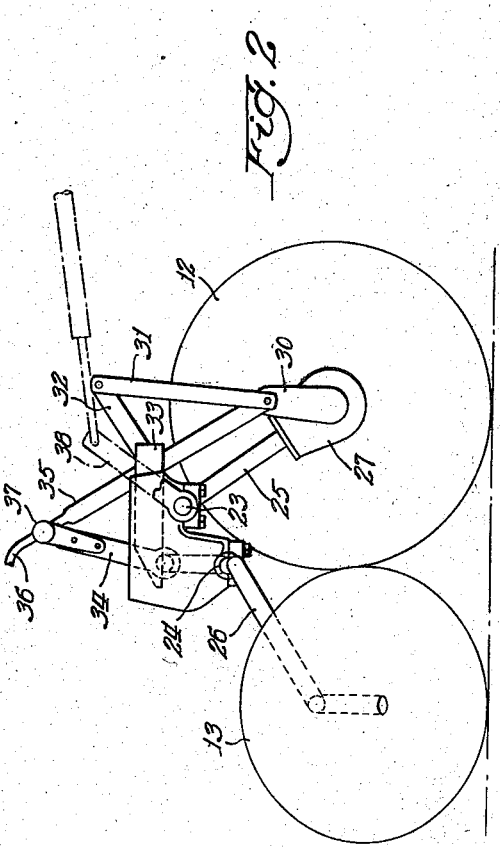
Inventor:
John R. Orelind
By Paul O. Pippel
Atty.

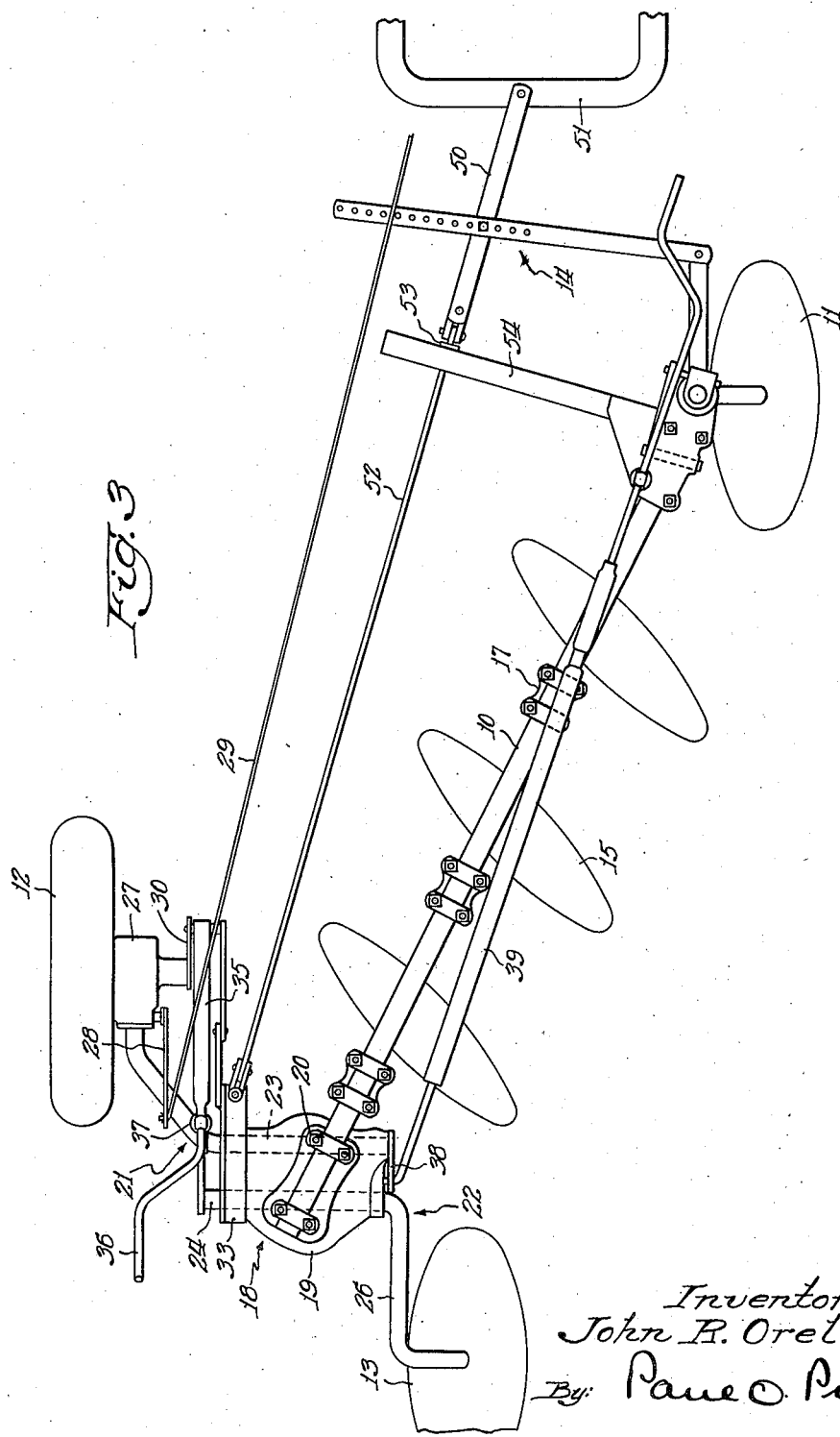

Patented Nov. 11, 1947

2,430,731

UNITED STATES PATENT OFFICE 2,430,731

AGRICULTURAL IMPLEMENT

John R. Orelind, Wilmette, Ill., assignor to International Harvester Company, a corporation of New Jersey Application October 16, 1944, Serial No. 558,856

6 Claims. (Cl. 97—103)

This invention relates to agricultural implements and particularly to disk plows and the like. More specifically the invention concerns lifting mechanism therefor.

Disk plows, harrow plows, and the like are generally drawn behind a tractor in a trailing position and comprise a longitudinally extending supporting frame usually having furrow wheels at the front and rear ends thereof and a land wheel laterally spaced from the furrow wheels. The frame includes a beam having a laterally angled portion upon which the disks are mounted.

In plows of this type one of the most persistent obstacles has been the development of suitable means for lifting the plow to transport position. This is customarily accomplished on large plows having a long wheel base by moving only the furrow wheel while keeping the land wheel more or less fixed, the plow being transported in tilted position. With a smaller plow having a shorter wheel base, however, the effect of tilting is magnified and difficulty is encountered in maintaining a suitable angle for the disks when changing depth of plow and the like. Therefore, it is important that the plow be lifted on all wheels.

In the past the mechanism for performing this function has been relatively complex, since not only must the plow be elevated on all wheels, but a differential must be observed between the movement of the land wheel and that of the furrow wheels. This is due to the fact that the lifting power is derived from the land wheel, and while the land wheel must move vertically a sufficient distance to transmit the movement to the furrow wheels necessary to take the working tools or disks out of the ground for transport, the land wheel must move an additional distance to properly level the plow. Therefore, the mechanisms previously developed have involved complex mechanical structures which have not been entirely satisfactory.

The present invention overcomes the obstacles previously encountered and has for an object the provision of a simple and efficient lift mechanism particularly useful for disk plows and the like.

Another object is to provide, in a wheel-supported implement wherein power is supplied by rotation of one wheel, improved means for transmitting lifting power to the other wheels.

Another object is to provide, in a plow having land and furrow wheels and lift means actuated by one wheel, novel and improved means for transmitting lifting power therefrom at a different rate to the other wheels.

Other objects and advantages of the invention will become clear from the following detailed description when read in conjunction with the accompanying drawings, wherein:

Figure 1 is a side elevation of a disk plow embodying the features of the present invention and showing the plow in operating position;

Figure 2 is a detail of the rear end of the plow of Figure 1, showing the position of the land and rear furrow wheels when the plow has been raised for transport; and Figure 3 is a plan view of the structure shown in Figure 1.

Referring to the drawings, it will be noted that the plow comprises generally a main frame bar or beam 10 set at an angle to the line of draft on the plow, a front furrow wheel 11, a land wheel 12, a rear furrow wheel 13, a draft frame 14, and a number of plow disks 15 mounted on standards 16 attached to the beam by clamps 17.

At the rear end of beam 10 a wheeled truck generally indicated at 18 is provided, which includes a casting 19 secured to the beam by bolts 20. The casting 19 functions as a bearing for a pair of crank axles 21 and 22 having transverse portions 23 and 24, respectively, journaled in the casting for swinging movement of the crank axles 21 and 22.

Crank axle 21 is provided with a crank portion 25 upon which is mounted the land wheel 12. Furrow wheel 13 is mounted upon crank portion 26 of crank axle 22. Power for raising and lowering the entire plow with respect to its supporting wheels is supplied by the land wheel 12 operating in conjunction with a conventional clutch mechanism 27 of the half-revolution type actuated by a lever 28 having attached thereto a rope 29 extending forwardly to a point accessible to the operator of the vehicle by which the plow is drawn.

Actuation of the clutch causes rotation of a crank arm 30. This crank arm, in moving the plow from operating position to transport position, moves from the position shown in Figure 1 to that shown in Figure 2. Crank arm 30 is pivotally connected at its end to a link 31, which in turn is pivotally connected at its other end to a strap 32 rigidly secured to a brace 33 affixed to the casting 19.

It will be noted that the inner end of the transverse portion 24 of crank axle 22 projecting through to the landward side of the casting 19 is provided with a rock arm 34. This arm is connected by an adjustable link 35 to the end of crank arm 30. Link 35 is adjustable in length by manipulation of a handle 36 to adjust the relative positions of the land and furrow wheels, and the end thereof secured to the rock arm 34 is mounted in a ball joint 37 for universal movement.

It will be noted in Figure 1 that the crank portion 25 of crank axle 21 supporting land wheel 12 extends forwardly in a generally horizontal position. Upon actuation of the clutch 27 by tripping lever 28 to raise the plow to transport position, the engagement of the clutch causes crank arm 30 to rotate with the land wheel 12 and to rotate to the position shown in Figure 2, swinging crank axle 21 downwardly and rearwardly. The link 31 swings through a similar arc about its pivot upon the strap 32. Thus the point of pivot of link 31 to crank arm 30 moves rearwardly from the position shown in Figure 1 to that shown in Figure 2. Since link 35 is pivoted upon the crank arm 30 at the same point as link 31, motion is transmitted through link 35 to rock arm 34 mounted on crank axle 22 so that the furrow wheel 13 is likewise moved downwardly to raise the plow to transport position.

However, as pointed out before, rear furrow wheel 13 need travel only sufficient vertical distance to place the disks 15 in transport position with respect thereto, while land wheel 12 must, in addition to the distance moved by furrow wheel 13, also travel the vertical distance represented by the depth of operation of the disks in the ground. Therefore, land wheel 12 is permitted to travel vertically a distance represented generally by the rotation of crank 30, while the movement imparted to rear furrow wheel 13 and transmitted thereto from the land wheel by link 35 is represented only by the longitudinal distance traveled by the point of pivot of links 31 and 35 upon crank arm 30, in the process of moving the plow from operating to transport positions.

Movement of land wheel 12 is transmitted to front furrow wheel 11 by the provision on the furrowward end of transverse portion 23 of crank axle 21 of a rock arm 38. Rock arm 38 is connected by an adjustable link 39 to one arm 40 of a bell-crank 41 pivoted upon a casting 42 secured by bolts 43 to the front end of beam 10. The other arm 44 of bell-crank 41 is connected by a rod 45 to a lug 46 secured to the upper end of a vertically extending spindle 47 mounted for sliding movement in bearing portion 48 of the casting 42 and having mounted upon its lower end the front furrow wheel 11. Link 39 is adjustable by a handle 49 to vary the plowing depth. When the plow is raised to transport position, the forward rocking movement of arm 38 acting through link 39 rocks bell-crank 41 forwardly to slide spindle 47 downwardly with respect to the bearing portion 48.

The plow of the present invention is adapted to be drawn behind a tractor or the like, and is provided with a hitch bar 50 attached as indicated in Figure 3 to the draw-bar 51 of the tractor, not shown. Hitch bar 50 is in turn pivotally connected to a draft bar 52, which extends rearwardly and is connected to the brace member 33 on casting 19. The forward portion of draft bar 52 passes through a slot in a strap 53 attached to an angle bar 54, which is affixed to the tool beam 10 and extends laterally therefrom.

It is believed that from the foregoing description the operation of the present invention will be clear. It should be understood, however, that modifications may be made in the novel lifting structure described without departing from the spirit of the invention or the scope of the appended claims.

What is claimed is:

1. In a wheeled plow, the combination with a frame and furrow openers connected therewith, of swinging crank axles mounted thereon, a land wheel journaled on one said axle, a furrow wheel on another said axle, lift means including a clutch associated with the land wheel axle and driven from the wheel, connecting means between the clutch and the frame including a crank arm operated by the clutch for rotation on an axis coaxial with the wheel, linkage connecting the free end of the crank arm to the frame for reaction thereagainst to raise or lower the frame upon swinging the land wheel axle, a rock arm on the furrow wheel axle, and linkage connecting the free end of said crank arm to said rock arm for transmitting swinging movement to said furrow wheel crank axle.

2. In a wheeled plow, the combination with a frame and furrow openers connected therewith, of swinging crank axles mounted thereon, a land wheel journaled on one said axle, a furrow wheel on another said axle, lift means including a clutch associated with the land wheel axle and driven from the wheel, connecting means between the clutch and the frame including a crank arm operated by the clutch for rotation on an axis coaxial with the wheel, linkage connecting the free end of the crank arm to the frame for reaction thereagainst to raise or lower the frame upon swinging the land wheel axle, and linkage connecting the free end of said crank arm to said furrow wheel crank axle for effecting swinging movement thereof.

3. In a wheeled plow, the combination with a frame and furrow openers connected therewith, of swinging crank axles mounted thereon, a land wheel journaled on one said axle, a furrow wheel on another said axle, lift means including a clutch associated with the land wheel axle and driven from the wheel, connecting means between the clutch and the frame including a crank arm operated by the clutch for rotation on an axis coaxial with the wheel, linkage connecting the frame to the crank arm at a point spaced from its axis for vertically moving the frame upon swinging the land wheel axle, and linkage connecting the furrow wheel crank axle to the crank arm at a point spaced from the axis of the latter for effecting swinging movement of the furrow wheel axle.

4. In a wheeled plow, the combination with a frame and furrow openers connected therewith, of swinging crank axles mounted thereon, a land wheel journaled on one said axle, a furrow wheel on another said axle, lift means including a clutch associated with the land wheel axle and driven from the wheel, connecting means between the clutch and the frame including a crank arm operated by the clutch for rotation on an axis coaxial with the wheel, means pivotally connecting the free end of the crank arm to the frame for reaction thereagainst to raise or lower the frame upon swinging the land wheel axle, the mounting of the land wheel crank axle on the frame being such that, upon swinging the said axle to raise or lower the plow, the free end of the crank arm, in addition to roation about its axis, moves with the axle both vertically and longitudinally, a rock arm on the furrow wheel crank axle, and linkage connecting the free end of said crank arm to said rock arm for transmitting motion thereto.

5. In a wheeled plow, the combination with a longitudinally extending frame and furrow openers connected therewith, of swinging crank axles pivoted thereon at longitudinally spaced locations, a furrow wheel on one said axle, a land wheel on another said axle, the mounting of the land wheel axle on the frame being such that the land wheel swings in an arc extending both vertically and longitudinally with respect to the frame, lift means including a clutch associated with the land wheel axle and driven from the wheel, connecting means between the clutch and the frame including a crank arm swingable with the land wheel axle and operated by the clutch for rotation on an axis coaxial with the wheel, linkage pivotally connecting the free end of the crank arm to the frame, a rock arm on the furrow wheel axle, and means connecting the free end of the crank arm to said rock arm, whereby the extent of movement imparted to said rock arm is determined only by the longitudinal movement of said crank arm.

6. In a wheeled plow, the combination with a longitudinally extending frame and furrow openers connected therewith, of swinging crank axles pivoted thereon at longitudinally spaced locations, a furrow wheel journaled on one said axle, a rock arm on said axle, a land wheel on the other axle, lift means including a clutch associated with the land wheel axle and driven from the wheel and a crank arm operated by the clutch and mounted coaxially with the wheel for swinging movement therewith, linkage pivotally connecting the free end of the crank arm to the frame to react thereagainst, and means for transmitting only a portion of the swinging movement of said land wheel axle to said furrow wheel axle comprising a link connecting the free end of said crank arm to said rock arm.

JOHN R. ORELIND.

REFERENCES CITED

The following references are of record in the file of this patent:

UNITED STATES PATENTS

| Number | Name | Date |
|---|---|---|
| 2,179,528 | Strandlund | Nov. 14, 1939 |